United States Patent [19]
Bezenek

[11] Patent Number: 4,776,548
[45] Date of Patent: Oct. 11, 1988

[54] LEVELING DEVICE

[76] Inventor: Barry C. Bezenek, Rte. 5, 44 Mapleview Dr., Columbia, Mo. 65201

[21] Appl. No.: 75,329
[22] Filed: Jul. 20, 1987
[51] Int. Cl.⁴ ............................................. F16M 11/20
[52] U.S. Cl. ................................. 248/188.2; 254/104
[58] Field of Search ...................... 248/188.2, 649, 669, 248/354.1, 352; 254/89 R, 104; 52/126.1; 182/200; 280/763.1; 180/41

[56] References Cited
U.S. PATENT DOCUMENTS

| | | | |
|---|---|---|---|
| 1,583,570 | 5/1926 | Booth | 254/104 X |
| 1,612,401 | 12/1926 | Townsend | 254/104 X |
| 2,539,703 | 1/1951 | Sato | 254/104 |
| 2,709,571 | 5/1955 | Mafera | 254/104 |
| 3,371,902 | 3/1968 | Hartwick | 52/126.1 |
| 3,407,548 | 10/1968 | Russell | 52/126.1 |
| 3,738,603 | 6/1973 | Arnett | 254/104 X |
| 4,014,517 | 3/1977 | Keagle | 52/126.1 X |
| 4,135,335 | 1/1979 | Jensen | 248/188.2 X |
| 4,281,739 | 8/1981 | Keiser | 248/188.2 X |

Primary Examiner—J. Franklin Foss
Attorney, Agent, or Firm—Kokjer, Kircher, Bradley, Wharton, Bowman & Johnson

[57] ABSTRACT

A leveling device for heavy structures such as mobile homes. A ramp forms a base having an inclined ramp surface covered by a metal plate provided with two columns of grooves. A wedge shaped walker has an inclined surface which mates with the ramp surface and a platform surface which is level when the inclined surfaces are engaged. Two columns of teeth are formed on a metal plate on the inclined surface of the walker to enter the grooves in a manner to lock the walker in place. Lateral guide rails prevent side to side movement of the walker and maintain the alignment of the teeth and grooves.

9 Claims, 1 Drawing Sheet

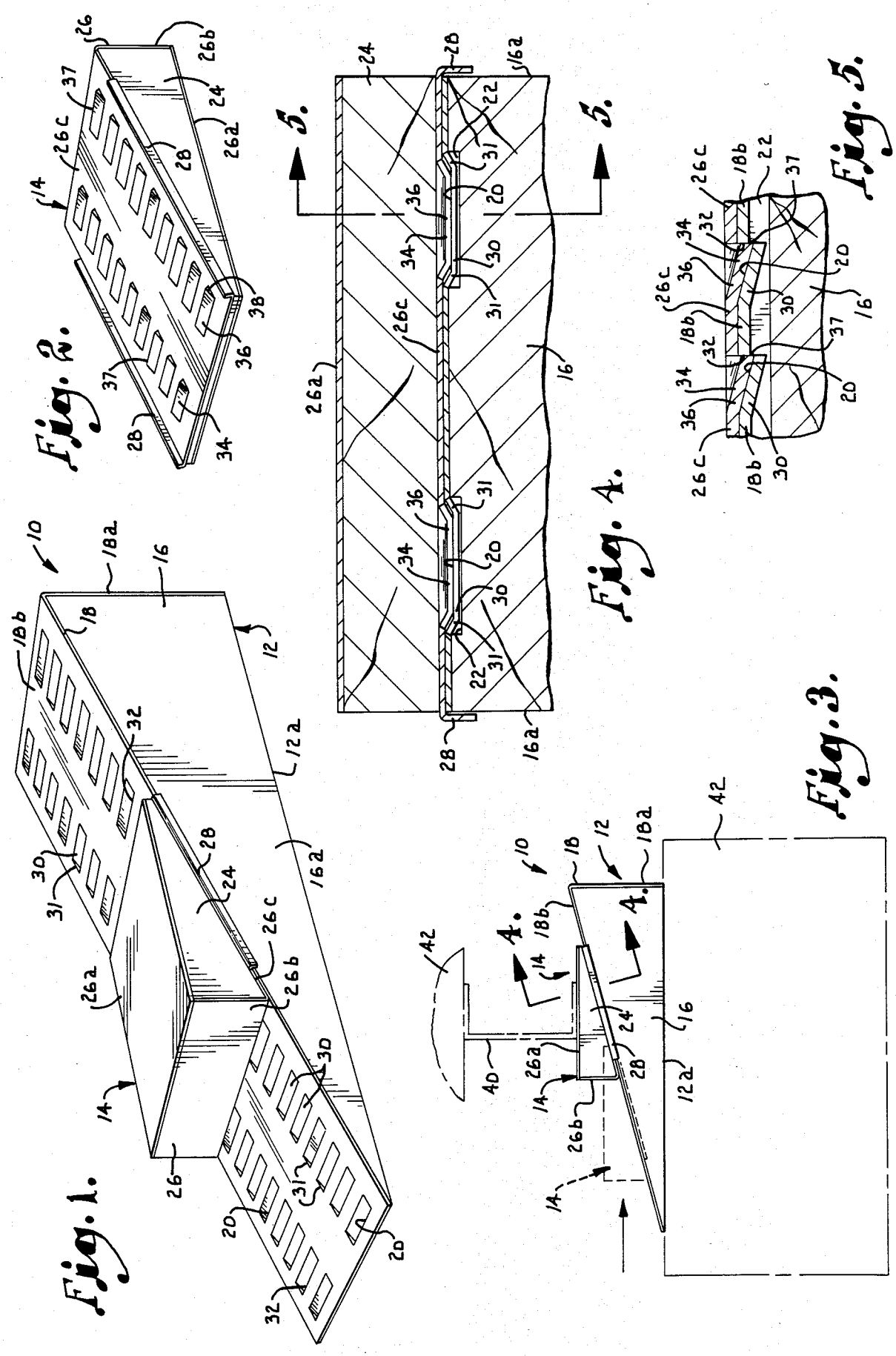

LEVELING DEVICE

BACKGROUND AND SUMMARY OF THE INVENTION

This invention relates in general to a leveling device and more particularly to a two-piece adjustable leveling wedge for use in the mobile home industry.

It is often necessary for an object to be on a level plane for proper operation. If the object is not level it will be unstable and have a tendency to "rock". On a small scale, an example of this problem would be a chair with one leg shorter than the others. This annoying problem is often solved by placing a wad of paper under the short leg until the chair is again level and stable. On a larger scale, the same type of problem exists when a mobile home is being set up. As can be appreciated, a homeowner doesn't want a home that "rocks" or is in any way unstable.

Presently, a mobile home is initially set-up on concrete blocks, but this normally does not place the home on a level plane. Standard concrete blocks and half blocks are typically used whether the home is set up on a concrete pad or just on the ground. The person setting up the home must test the perimeter of the mobile home for levelness and make the proper adjustments. This is normally done by jacking the home up, testing an area of the home for levelness and adjusting it up or down until it is level. When the mobile home has been adjusted to levelness, often there will be a gap between the concrete blocks and the frame of the mobile home. This problem is currently solved by placing shimstock or other filler material between the concrete blocks and the frame of the mobile home to fill the gap. Sometimes this shimstock is capped with a piece of metal to more evenly distribute the weight of the home so as not to crush the wood. Once this procedure has been done, it is often necessary to repeat this process because when other areas of the home are adjusted to levelness, this often has the effect of making a previously leveled area unlevel. Again the mobile home must be jacked up, the shimstock removed, the home readjusted to a level plane. The shimstock is again added or removed to fill the gap created. Often this shimstock is forced into place by wedging the shimstock into place with a hammer. This can split the shimstock and thereby lessen its long-term effectiveness. As it is, the shimstock is often subject to destruction or degradation by the elements of nature. If a cap is not used, the shimstock can be crushed and, with time, the levelness of the home will change and must be completely releveled.

If the shimstock used to level the mobile home degrades and the home again become unlevel, the time consuming process of leveling the home must be repeated. Under the current method employed, shimstock or other material to be used in leveling a mobile home or other object must be obtained in sufficient quantities from a lumberyard. There is no uniformity of the shimstock used and whatever is available is used. This can lead to inconsistent and unreliable grades of shimstock or material being used to level a home. The shimstock also compresses under the weight of a mobile home very easily. After the first attempt to level the mobile home has been completed and the second releveling procedure is started, the entire process of testing the level of the mobile home at each particular point and then adding or removing shimstock must be repeated. This is a very time consuming procedure as there is no quick way to adjust the shimstock to the necessary amount on the second pass. There is currently no quick, uniform or sturdy method of filling the gaps created by this leveling procedure. The use of shimstock to solve this problem is time-consuming and inefficient. Also, the shimstock is generally not reusable if the home needs to be releveled at a later date.

It is thus evident that there is a need for a leveling device in industries where shimming devices are used, especially the mobile-home industry, that is reusable, saves time, strong, uniform, dependable, adjustable and efficient. It is a primary object of the present invention to provide such a leveling device.

The present invention is directed to a leveling device that can be used in any industry when shimming is required and especially in the mobile home industry. In accordance with the invention, a two-piece leveling wedge with corresponding teeth on one piece and grooves on the other serves as the shimming device. The walker-platform piece can be quickly adjusted up or down the ramp-base piece to the necessary height to fill a gap. This device also provides a metallized platform for structural strength.

It is an object of this invention to provide an adjustable leveling device constructed to perform in a variety of situations.

It is a further object of the present invention to provide a leveling device that is structurally strong enough to withstand at least 10,000 pounds of weight.

It is a still further object of this invention to provide a leveling device that is constructed to resist destruction and degradation by the elements of nature.

It is another object of this invention to provide a leveling device that is quickly and easily adjustable to a variety of heights so that a wide range of use is possible.

It is still another object of this invention to provide an adjustable two-piece leveling wedge having a bottom ramp with two columns of louvred grooves providing a base for a smaller platform having two columns of corresponding louvred teeth that when aligned with the grooves, can be coupled together in a secure manner while remaining capable of being adjusted.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a perspective view of a preferred embodiment of the present invention;

FIG. 2 is a perspective view of the underside of the walker-platform piece of the preferred embodiment of the present invention;

FIG. 3 is a side elevational view showing the present invention in use;

FIG. 4 is a fragmentary cross-sectional view taken along line 4—4 of FIG. 3 showing the manner in which the walker-platform piece couples with the base piece; and FIG. 5 is a fragmentary sectional view taken along the line 5—5 of FIG. 4 showing the manner that the walker-platform couples with the base.

DETAILED DESCRIPTION OF A PREFERRED EMBODIMENT OF THE INVENTION

Referring initially to FIG. 1, a two-piece leveling device of a preferred embodiment of the present invention is generally designated by the numeral 10. A ramp 12 forms a base piece and a wedge shaped walker 14 provides an adjustable platform piece. Ramp 12 is generally triangular when viewed from the side and is constructed from a material suitable to withstand, at a minimum, 10,000 pounds of weight. A suitable material of a preferred embodiment of the present invention for the ramp is wood from a yellow pine or Douglas fir. Ramp 12 has a bottom structure 12a which rests on a supporting surface. The ramp comprises two pieces, a ramp shaped base 16 having opposite sides 16a, a metal plate 18 which covers the inclined upper surface of base 16 and its vertical back surface. Plate 18 has two parallel columns of louvred grooves 20. The inclined plane of base 16 of ramp 12 has two grooved channels or tracks 22 which are best shown in FIG. 4 and run the length of the inclined plane of base 16. Each track 22 is the same width as groove 20. Plate member 18 is constructed from a metal that is structurally sufficient to withstand weight of at least 10,000 pounds. In a preferred embodiment of the present invention, member 18 is constructed from 18 gauge metal and can be galvanized and/or anodized, if necessary.

Plate member 18 has a planar back surface 18a and an inclined surface 18b presenting the two columns of louvred grooves. Plate member 18 is constructed so that it fits over and completely covers the inclined plane and substantially cover the back surface of base 16. The back surface 18a of member 18 fits up against the back surface of base 16 and the inclined surface 18b of member 18 contacts with and overlays the inclined surface of base 16. The columns of grooves 20 presented on member 18 are manufactured to fit in the tracks 22 in base 16. Base 16 and member 18 are rigidly secured to each other, preferably through use of an adhesive sufficient to withstand a weight of 10,000 pounds. Adhesive is not applied to tracks 22, of base 16, and grooves 20 of member 18 are not adhered to the tracks.

Referring now more particularly to FIG. 2, walker-platform 14 also comprises two parts. A generally triangular base 24 that is of the same width as base 16 of ramp 12 but smaller in length and height provides one part, and a bent plate 26 forms the other part. Member 26 of walker 14 has three sides, a planar platform surface 26a, a planar back surface 26b, and a toothed surface 26c. Base piece 24 of walker 14 has a planar bottom surface, a planar back surface and a planar inclined surface corresponding in size and shape to the respective surfaces 26a, 26b and 26c of member 26. Plate member 26 is constructed to fit loosely around and completely cover the base 24. The angle of incline of the inclined surface of base 24 and that of the inclined toothed surface 26c of member 26 are identical. The platform surface of member 26 can be a separate piece if desired. Plate member 26 is rigidly secured to triangular base 24 by an adhesive sufficient to survive weights of at least 10,000 pounds.

Member 26 also presents on the side edges of surface 26c two flanges which provide rails 28 extending away from and generally perpendicular to the inclined surface 26c of member 26. Rails 28 are spaced apart a distance slightly greater than the width of base 24.

Each groove 20 is formed by punching a slat 30 from the plate surface 18b such that one long edge of each slat is separated from the plate while the other long edge remains attached to the plate. Each groove 20 has opposite sides 31 which are generally triangular and connect the side edges of slat 30 with plate 18b. The depression of each groove 20 is generally rectangular and is formed so that it projects below member 18 so that a gap is created between member 18 and the free edge of slat 30. This depression forms an edge 32 on member 18 at the lower edge of each groove. The grooves 20 may be formed by any method known to those skilled in the art. The triangular sides 31 of each groove 20 act as gussets to structurally strengthen the groove area.

A surface 26c of plate 26 is provided with two columns of projecting teeth 34. Each tooth 34 is formed and located to fit into one of the grooves 20, and the teeth 34 are spaced apart the same distance as the grooves 20 so that all of the teeth fit into grooves simultaneously. Each tooth 34 is lesser in width than groove 20 so that the teeth 34 removably fit into grooves 20. Teeth 34 are formed in substantially the same manner as grooves 20 and include slats 36 which terminate in the edges 37 connected to surface 26c by triangular gussets 38. The gussets 38 angle toward the centers of teeth 34. When a tooth 34 fits into a groove 20, the contact line is between the edge 37 of the tooth and the edge 32 of the groove.

As can best be seen in FIG. 4, the rails 28 of member 26 extend closely along the opposite sides 16a of base 16 thereby serving as a lateral guide to keep walker 14 in alignment with ramp 12. The side rails 28 keep the walker 14 from sliding off of the sides of ramp 12 or otherwise moving sidewardly when applied to the base. Rails 28 also ensure that the columns of teeth 34 are aligned with the columns of grooves 20.

Referring now to FIG. 5, when one of the teeth 34 slides into the depression of groove 20, the edge 37 of the tooth contacts the edge 32 of groove 20. In addition, slat 34 closely overlies the slat 30 of the groove which receives the tooth, and the gusseted sides 38 and 31 also lie against one another. The contact between edges 37 and 32 locks walker 14 to ramp 12 and prevents walker 14 from sliding down ramp 12.

In operation, walker piece 14 is placed atop base piece 12 with the inclined surfaces 26c and 18b against one another such that the columns of teeth 34 align with the columns of grooves 20 and the flat surface 26a of walker 14 faces upwardly. The triangular walker 14 is positioned with its most acute angle pointing in the opposite direction of the most acute angle of triangular ramp 12 so that the combination of the two pieces results in surface 26a being parallel to the bottom surface of ramp 12, thus maintaining surface 26a in a level condition. A frame 40 (FIG. 3) or other structure can be placed on top of this platform surface 26a of walker 14. Once the frame has been leveled and held level by a jack or other device, leveling device 10 can be placed in the gap between a support 42 and the frame 40 and walker 14 can be adjusted up or down on ramp 12 until the platform surface 26a of walker 14 contact the frame 40.

In a preferred embodiment of the present invention, when the support structure 40 is the frame of a mobile-home, leveling device 10 can be placed atop the concrete blocks acting as supports 42 and, after the home has been tested at various points for levelness, walker 14 can be raised or lowered to the proper height so that the platform of walker 14 contacts the frame. When the jack is then removed, the home is supported on device 10 in a level condition. While it is not suggested, walker 14 could be tapped on its planar back surface 26b to thereby forcefully drive the walker 14 up to the next step in which teeth 34 mate with grooves 20 if the level plane is in between a step of the teeth and grooves. The plate 18a similarly provides a surface for driving of ramp 12 if necessary. It is estimated that approximately 16 suitably spaced leveling devices 10 would be necessary to level a typical mobile home. After the mobile home has been leveled once by testing the perimeter of the mobile home and adjusting each point as needed, if a second procedure is required, it can be done very quickly and efficiently through the use of the present invention. This is because if the mobile home needs to be releveled in any other areas, walker 14 can be slid upward or downward quickly and easily to the desired height. It is noted that in the assembled condition of the device 10, the two inclined surfaces 18b and 26c bear against one another and thereby provide wedging action if it is necessary to drive the wedge shaped walker 14 upwardly on ramp 12. Because a large number of teeth are interlocked with a corresponding number of grooves, the forces of applied loads are distributed across and along plates 18b and 26c to effectively spread the loads between the bearing plates.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A leveling device comprising:
   a ramp member having a generally planar bottom surface for resting on a support surface and an inclined ramp surface;
   a first metal plate secured on and substantially covering said ramp surface;
   a wedge shaped platform having an inclined surface for application to said ramp surface and a generally planar platform surface oriented substantially parallel to said bottom surface when said inclined surface is applied to said ramp surface;
   a second metal plate secured to and substantially covering said platform surface;
   a third metal plate secured to and substantially covering said inclined surface;
   a plurality of teeth projecting from one of said first and third plates in two parallel columns and a plurality of grooves projecting from the other of said first and third plates in two parallel columns, each groove presenting an edge adjacent thereto and each tooth terminating in a free edge with the edges of the teeth arranged to engage the edges of the grooves in edge to edge contact in a manner to lock said third plate against sliding movement down said first plate.

2. The device of claim 1, including:
   a back surface of said platform; and
   a metal plate integral with said third metal plate secured to and substantially covering said back surface to permit the platform to be tapped so that same may move up the ramp member and to prevent said third metal plate from becoming disengaged from said platform.

3. A leveling device comprising:
   a generally triangular ramp member having a generally planar bottom surface for resting on a support surface, a back surface and an inclined ramp surface;
   a first metal plate secured on and substantially covering said ramp surface and said back surface integrally to prevent said plate from becoming disengaged from said ramp surface;
   a plurality of grooves in said first metal plate arranged in a pair of parallel columns thereon;
   a wedge shaped platform having an inclined surface for application to said ramp surface, a back surface, and a generally planar platform surface oriented substantially parallel to said bottom surface when said inclined surface is applied to said ramp surface;
   a second metal plate secured to and substantially covering said platform surface;
   a third metal plate secured to and substantially covering said inclined surface and said back surface integrally to prevent said plate from becoming disengaged from said ramp surface; and
   a plurality of teeth projecting from said third plate and arranged in a pair of parallel columns thereon at locations to enter and interlock with said grooves to lock said third plate to said first plate.

4. The device of claim 3, including:
   an edge at the border of each groove; and
   an edge on each tooth engageable with said edge of the groove in which the tooth is received to interlock the edges of the teeth with the edges of the grooves in edge to edge contact.

5. A leveling device comprising:
   a generally triangular wooden ramp having a planar bottom, a back and an inclined ramp surface;
   a first metal plate member overlaying the inclined ramp surface and the back surface of said wooden ramp and presenting a plurality of grooves on said inclined surface arranged in two columns thereon;
   a wedge shaped wooden walker having a planar platform surface, a back surface and an inclined surface; and
   a second metal plate member overlaying the inclined surface and the back surface of said wooden walker and presenting two columns of teeth located to removably fit into said grooves of said triangular member to lock said walker to said ramp.

6. The device of claim 1, including:
   a back surface of said ramp; and
   a metal plate integral with said first metal plate secured to and substantially covering said back surface to prevent said first metal plate from becoming disengaged from said ramp.

7. The device of claim 2 wherein said platform is wooden and said metal plate overlays said wooden platform.

8. The device of claim 6 wherein said ramp member is wooden and said metal plate overlays said wooden ramp member.

9. The device of claim 5, including:
   an edge at the border of each groove; and
   an edge on each tooth engageable with said edge of the groove in which the tooth is received to interlock the edges of the teeth with the edges of the grooves in edge to edge contact.

* * * * *